July 21, 1959

E. D. BEACHLER 2,895,348

MACHINE DRIVE

Filed Jan. 21, 1958

Inventor
EDWARD D. BEACHLER

United States Patent Office 2,895,348
Patented July 21, 1959

2,895,348

MACHINE DRIVE

Edward D. Beachler, Beloit, Wis., assignor to Beloit Iron Works, Beloit, Wis., a corporation of Wisconsin Application January 21, 1958, Serial No. 710,257

13 Claims. (Cl. 74—689)

The instant invention relates to a drive mechanism, and particularly to a drive mechanism for paper making machines, and further more particularly to a means for starting and operating individual sections of a lineshaft driven paper making machine.

Although it will be appreciated that the instant invention may have use in a number of fields, it is particularly useful in paper machine drives. The instant invention overcomes the serious difficulties experienced with clutches in paper machine drives, particularly those which drive drier sections or calender sections, both of which are characterized by very large inertial loads. As will be appreciated, the starting torques in such paper machine sectional drives are of tremendous magnitude, probably larger than are found in other industrial machinery. Normally these drives remain connected for long periods of time, but on occasion it becomes necessary to start and stop the machine at frequent intervals. At such times, the heat dissipating ability of any known flexible connection such as a clutch is insufficient and friction plates, disks, and the like are subject to being destroyed by the heat. This results in a large item of maintenance expense.

The instant invention overcomes many of these difficulties by the arrangement of a non-flexible or rigidly connected double differential gear train in combination with a water cooled brake in preference to the usual main friction clutch. A second branch is provided in the power train for the purpose of introducing a variable speed increment into the pair of differential gear assemblies, thereby enabling the operating speed of the unit to be varied from a base value. The second power train includes a variable speed unit which introduces a low speed torque into one of the differential units. Because of the low speed in the second branch, the second branch is called upon to transmit far less power, whereby overloading of its components is avoided. A water cooled brake is provided with one of the differential units, and the brake is used to start the driven section. The heat generated during the period that the machine section or load is being accelerated is easily dissipated into circulating cooling water. When the driven section reaches operating speed, the brake drum will have come to rest. The speed variation mentioned to be accomplished may be effected either during or after the intial acceleration of the load.

It is, therefore, an important object of the instant invention to provide an improved paper machine drive mechanism.

Another object of the present invention is to provide a drive mechanism which employs a brake in place of a heretofore used clutch.

Yet another object of the present invention is the provision of means for dissipating starting friction of a differential drive assembly at a place where cooling may be efficiently effected.

Another object is to provide a drive mechanism in which smooth controlled starting is possible with the steady acceleration of high inertia rotating loads without recourse to a heavily loaded clutch wherein both members rotate and are therefore difficult to cool adequately.

An additional object is to provide a drive mechanism whereby a heavy load may be accelerated to its greatest speed expeditiously, but without causing an overload to the drive mechanism itself.

Many other advantages, features and additional objects of the present invention will become manifest to those versed in the art upon making reference to the detailed description and the accompanying drawings in which preferred structural embodiments incorporating the principles of the present invention are shown by way of illustrative example.

Figure 1:
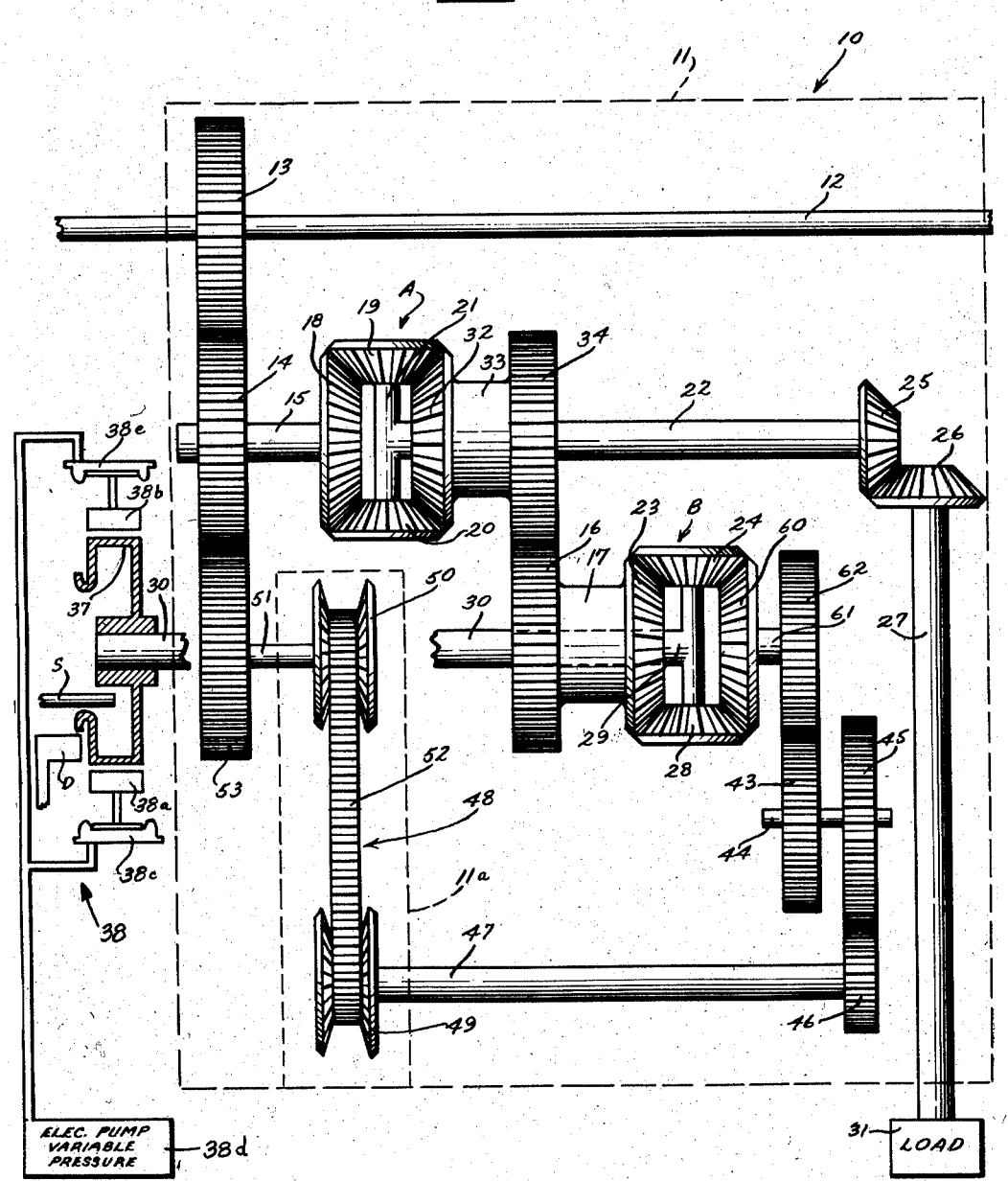
Figure 1 is a top plan view, with parts shown diagrammatically, of a paper machine drive mechanism embodying the principles of the instant invention.

The principles of this invention are particularly useful when embodied in a paper machine drive mechanism such as illustrated in Figure 1, generally indicated by the numeral 10. The drive mechanism 10 typically comprises a gear housing 11, mounting therewith a variable speed-ratio drive housing 11a, such housing being indicated diagrammatically only by dashed-lines.

A rotating source of power or rigid driven lineshaft 12 extends the full length of the paper machine, being arranged for mounting in and through each of several sectional drive units 10 for driving several such units. The housing 11 encloses a portion of the lineshaft 12 which corotatably mounts a gear 13. The gear 13 meshes with and drives a second gear 14 corotatably mounted on a shaft 15 that is mounted for rotation on suitable bearings. For the sake of clarity and simplicity, the various bearings within the housing 11 have been omitted.

The shaft 15 corotatably mounts the first of three rotary elements of a first differential gearing assembly indicated generally by the reference letter A. This first rotary element is a beveled gear 18; the shaft 15 and the gear 18 comprise one branch of a divided power train.

The second rotary element in the differential gearing assembly A comprises opposed beveled pinions 19 and 20 rotatably and bearingly carried on a pinion carrier, frame or rack 21, and which pinions are each meshed with the beveled gear 18. The frame 21 integrally joins with a shaft 22 to form a T-shaped arrangement whereby the pinions 19 and 20 are rotatably carried at extremities of the arms of the T which in turn are rotatable about the stem of the shaft 22 of the T.

The stem of shaft 22 is mounted for rotation on bearings (not shown), and the shaft 22 corotatably carries a pinion or bevel gear 25 that meshes with and drives a pinon or bevel gear 26 corotatably carried on still another shaft 27. The pinion carrier 21, the shaft 22, the gears 25 and 26, and the shaft 27 comprise an output train of the drive.

Power is transmitted from the shaft 27 directly, and not through a clutch, to the load 31. If desired, suitable gearing may be included therebetween. Details of such gearing and of the load are not necessary for the purposes of the instant invention, but it is sufficient to know that such an arrangement is old and well known in the art.

The gears 19 and 20 mesh with a beveled gear 32 which forms the third rotatable element of the first differential gearing assembly A. The beveled gear 32 is corotatably mounted on a hollow shaft or sleeve 33, which is mounted for rotation on suitable bearings (not shown), and which sleeve corotatably carries another gear 34.

The gear 34 is drivingly connected to a gear 16 which is corotatably mounted on a hollow shaft or sleeve 17, which sleeve is mounted for rotation on a pair of bearings (not shown), and which sleeve corotatably carries another gear 23. The gear 23 is the first of three rotary elements of a second differential gearing assembly indicated generally by the reference letter B.

The second rotary element in the second differential gearing assembly B comprises opposed beveled pinions 24 and 28 rotatably and bearingly carried on a pinion carrier, frame or rack 29 by means of a pair of bearings (not shown), and which pinions are each meshed with the beveled gear 23. The frame 29 integrally joins with a shaft 30 to form a T-shaped arrangement whereby the pinions 24 and 28 are rotatably carried at the extremities of the arms of the T which in turn are rotatable about the stem or shaft 30 of the T.

The stem or shaft 30 is mounted for rotation on bearings (not shown), and the shaft 30, broken in the drawing for the sake of clarity, extends outwardly of the housing 11 and exteriorly thereof corotatably carries a brake drum 37.

The gears 24 and 28 mesh with a beveled gear 60 which forms the third rotary element of the second differential gearing assembly B. The beveled gear 60 is corotatably mounted on a shaft 61, which is mounted for rotation on a pair of bearings (not shown), and which shaft 61 corotatably carries another gear 62, which may be termed a control gear.

The shaft 30 carries the brake drum 37 at one extremity thereof, and the brake drum 37 is preferably hollow and water-cooled and therefore disposed externally of the housing 11. The water-cooled brake drum 37 is provided with a brake actuating arrangement generally indicated at 38, and more specifically is mounted for frictional cooperation with a pair of brake shoes 38a and 38b of suitable friction material. The shoes are connected to motors or actuators 38c, e.g. of the fluid type, which are under the control of an electrically operated pump 38d. As indicated diagrammatically, a source S of cool water feeds water to the brake drum 37 and a drain D receives heated water from the brake drum 37.

As will be appreciated, other brake actuating and water cooling arrangements for the brake shoes 38a, 38b may be employed. The important feature with respect to the instant invention is that substantial amounts of water or other cooling fluid may be continually employed to control the temperature of the brake 37, 38 and to prevent overheating of equipment. This is not the case inside of the housing 11, wherein complicated bearing arrangements and the like make water cooling practically impossible. For this reason, the brake 37, 38 is preferably mounted outside of the housing 11 and preferably an appreciable distance therefrom so as to permit the proper functioning of the water cooling arrangement.

A second branch of the divided power train is also driven by the gear 14 and includes a gear 53 drivably meshing therewith. The gear 53 is corotatably carried on an input shaft 51 of a variable speed-ratio drive element 48 shown diagrammatically within the housing 11a.

The internal structural details of the variable speed-ratio drive element 48, all contained within the housing 11a, do not per se form a part of the instant invention. However, a preferred embodiment of this invention includes a stepless variable speed unit or element having a pair of pulley wheels 49 and 50 of variable effective diameter with either smooth or toothed contact surfaces or faces drivingly engaged by an endless flexible belt or chain 52 of appropriate construction, and more preferably includes the positively engaging type employing the toothed contact surfaces which, being incapable of internal slippage, can comprise one element of a rigidly connected together or slippage-free power train. Reference may be had to U.S. Patent No. 2,329,911 and to other patents referenced therein for further teaching relative to this type of apparatus.

The variable speed-ratio drive element 48 has an output shaft 47 on which a gear 46 is corotatably mounted. The gear 46 meshes with a larger gear 45 to effect a speed reduction, e.g. 2:1. The gear 45 and a smaller gear 43 are corotatably carried on a shaft 44. The gear 43 meshes with the gear 62 which may be slightly larger to effect a second speed reduction.

Thus the gear 53, the element 48, the gears 46, 45, 43, 62, and the second differential gearing assembly B comprise the second branch of the divided power train.

Referring now to the operation of the drive mechanism 10, various advantageous features thereof will become apparent. The device, as drawn, represents the idle or at-rest condition wherein the brake-drum 37 is free to rotate.

Initially, the lineshaft 12 is driven rotatably by a source of rotational power (not shown) whereby the gear 18 or first element is driven through the gears 13, 14. Thus, the first branch of the divided power train is immediately driven by and with lineshaft 12.

The high inertial load, being connected to the output shaft 27, prevents the pinion carrier 21 or second element from turning whereby the pinions 19 and 20 are rotated only on their own axes by the gear 18. The rotation of the pinions 19 and 20 causes the gear 32 or third element of the differential gear A to rotate, and with it the gear 34 driving the gear 16, the shaft or sleeve 17 and the gear 23. It can be seen that the gear 23 will rotate at substantially the same speed as the lineshaft 12 in the instant embodiment, up to this point.

On the other hand, the lineshaft 12 acting through the gears 13, 14, 53, 46, 45, 43 and 62 will be causing the gear 60 to rotate at a speed somewhat slower than the speed of the lineshaft 12. Accordingly, the difference in speeds of rotation between the gears 23 and 60 will cause rotation of the rack 28, the shaft 30 and the brake drum 37.

It can be seen that the effect of the mechanism intermediate the gears 53 and 62 is to apply a restraint to the rotation of the gear 62. If the variable speed-ratio element 48 be set to a greater speed reduction, the rotation of the gear 62 is even slower under this initial condition. Accordingly, an advantageous but less preferable structure may be provided wherein that portion of the second branch of the power train including the gears 53, the speed-ratio element 48, and the gears 46, 45 and 43 omitted. Where power need not be transmitted through the gear 62, it may be restrained by other means. While such a structure may be used to advantage, a structure having all of these features is preferable.

The components of the mechanism 10 thus placed into rotation offer negligible load or resistance to rotation.

When several drive mechanisms 10 are used to drive several paper machine sections, any one drive mechanism may be allowed to run in the foregoing manner until it is desired to place the section with which it is associated into operation.

In order to start operation of the output train and load, a braking torque is applied to the drum 37 by causing the brake shoes 38a, 38b, to be forced against the brake drum 37. The braking torque may be limited and regulated by controlling the fluid pressure supplied to the actuators 38c, in order to thus regulate the speed at which the section is accelerated, and to prevent the overloading of the gears in the various trains.

Heat is developed by the frictional slippage between the brake drum 37 and the brake shoes 38a, 38b, which heat flows to the continually circulating water which is continually drained away. The braking torque applied to the brake drum 37 is transferred through the gears 24 and 28 to the gear 23, and to the gears 16 and 34. This torque opposes the relatively free rotation of the pinions 19 and 20, and the carrier 21 is thereby compelled to rotate. The braking may be continued until the brake drum is brought to a full stop, thereby simultaneously bringing the output train and load up to speed.

It is also to be understood that an advantageous structure may be provided wherein the variable speed-ratio element 48 be omitted, such structure being characterized by having a fixed speed ratio between the lineshaft 12 and the output shaft 27 when the brake is locked. A more advantageous structure, however, includes this element.

With the gears 14 and 53 of equal size, and with the variable speed-ratio element 48 set to a 1:1 ratio, the gear 46 also rotates at the lineshaft speed. Thus when stepdowns are provided in the second branch of the power train, the gear 60 rotates at a somewhat slower speed than the lineshaft, and in the same direction, but opposite to the rotation of the gear 23. It can be seen that if a reversing gear were added to either branch, these elements could be made to rotate in the same direction but at a different speed.

It is thus apparent that the brake herein provided is operative to accelerate the connected load and not to decelerate it. To shut down or stop the driven load, it is merely necessary to deenergize or disengage the brake, thereby permitting the load to coast to a standstill.

Figure 2:
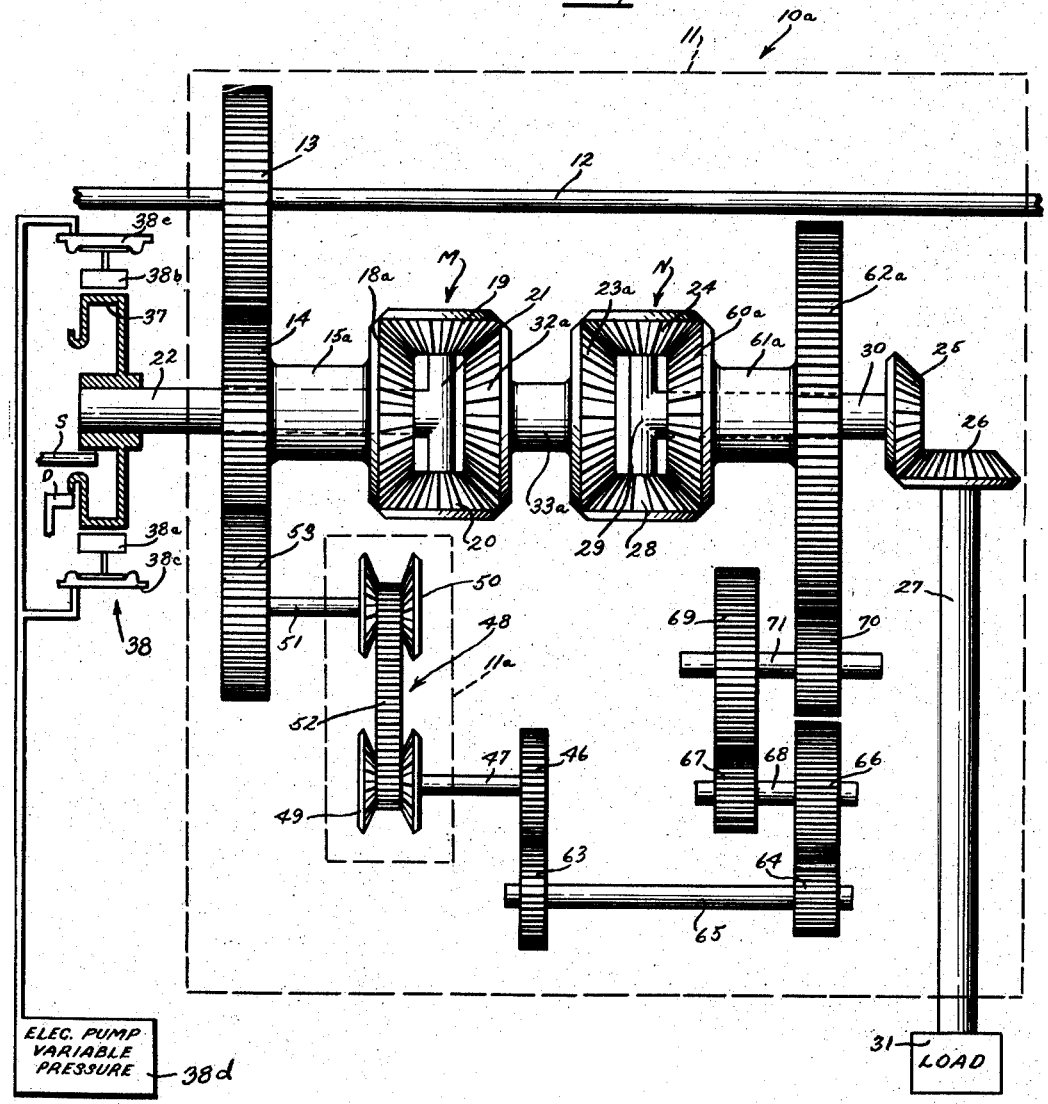
Figure 2 is a top plan view, generally similar to Figure 1, of a modified form of the instant invention.

Referring now to Figure 2, there is shown another embodiment of the instant invention which has substantial similarity to the embodiment shown in Figure 1. In the second embodiment, it will be noted that the gearing between the two differential drives has been eliminated, and that the functions of the second elements of the respective differential gearing assemblies have been exchanged with each other. Accordingly, similar reference numerals have been applied to the instant drawing, wherever practicable.

On Figure 2, the reference numeral 10a indicates the drive mechanism as a whole. The mechanism 10a includes the housing 11, the variable speed ratio drive housing 11a, the lineshaft 12, and the gear 13 driving the second gear 14 which is corotatably mounted on a hollow shaft 15a.

For the sake of clarity and simplicity, the bearings have again been omitted from the drawing.

The hollow shaft 15a corotatably mounts the first of three rotary elements of a differential gearing assembly indicated generally by the reference letter M. This first rotary element is a beveled gear 18a, and the shaft 15a and the gear 18a comprise one branch of a divided power train.

The second rotary element in the differential gearing assembly M comprises opposed beveled pinions 19 and 20 rotatably and bearingly carried on a pinion carrier, frame or rack 21 by means of a pair of bearings (not shown) and which pinions are each meshed with the beveled gear 18a. The frame 21 integrally joins with the shaft 22 to form a T-shaped arrangement whereby the pinions 19 and 20 are rotatably carried at extremities of the arms of the T which in turn are rotatable about the stem or shaft 22 of the T.

The stem or shaft 22 is mounted for rotation on bearings (not shown), and the shaft 22 extends through the hollow shaft 15a and outwardly of the housing 11 and corotatably carries the brake drum 37. The other features of the braking mechanism are the same as that shown and described for Figure 1.

The third element of the differential gearing assembly M is a bevel gear 32a which meshes with the pinions 19 and 20 and which is corotatably carried on a shaft 33a which also corotatably carries the first of three rotary elements of the second differential gearing assembly N. This first rotary element is a bevel gear 23a. The shaft 33a is journaled in bearings, not shown.

The second rotary element in the differential gearing assembly N comprises the opposed beveled pinions 24 and 28 rotatably and bearingly carried on the pinion carrier, frame or rack 29 by means of a pair of bearings (not shown), and which pinions are each meshed with the beveled gear 23a. The frame 29 integrally joins with the shaft 30 to form a T-shaped arrangement whereby the pinions 24 and 28 are rotatably carried at extremities of the arms of the T which in turn are rotatable about the stem or shaft 30 of the T.

The stem or shaft 30 is mounted for rotation on bearings, not shown, and the shaft 30 corotatably carries the pinion or beveled gear 25 that meshes with and drives the pinion or beveled gear 26 corotatably carried on the shaft 27. The shaft 27 is connected to the load 31 as described before. The pinion carrier 29, the shaft 30, the gears 25 and 26, and the shaft 27 comprise the output train of the drive.

The gears 24 and 28 mesh with a beveled gear 60a which forms the third rotary element of the differential gear assembly N. The beveled gear 60a is corotatably mounted on a hollow shaft or sleeve 61a, which is mounted for rotation on a pair of bearings, not shown, and which sleeve corotatably carries another gear 62a, which may be termed a control gear.

The second branch of the divided power train is also driven by the gear 14 and includes the gear 53 drivably meshing therewith. The gear 53 is corotatably carried on the input shaft 51 of the variable speed-ratio drive element 48 as above described, the output of which includes the output shaft 47 on which the gear 46 is corotatably mounted. The gear 46 is operatively connected to the control gear 62a by a step-down gear train including a pair of gears 63 and 64 corotatably carried on a shaft 65, a pair of gears 66 and 67 corotatably carried on a shaft 68, and a pair of gears 69 and 70 corotatably carried on a shaft 71. It will be understood that the number of gears in the step-down train, and the degree of step-down is a matter of choice, it being the function of the step-down gears to reduce the velocity of the rotation of the control gear 62a in order that a relatively small fraction of the torque load be transmitted by the variable speed-ratio element 48.

The operation of this embodiment is similar to that of the other embodiment, wherein the condition of the mechanism, as drawn, represents the idle or at-rest condition, the brake-drum 37 being disengaged from its shoes.

As before described, initially the lineshaft 12 is driven rotatably whereby the gear 18a or first element is driven through the gears 13 and 14. Thus, the first branch of the divided power train is immediately driven by and with the lineshaft 12.

The high inertia load, being connected to the output train, prevents the pinion carrier 29 or second element of the second differential gearing assembly N from turning, whereby the pinions 24 and 28 are free to turn only on their own axes.

The second branch of the divided power train, which includes the gear 53, the element 48, and the step-down train connected to the control gear 62a, causes a relatively slow rotation of the gear 60a, its speed being somewhat less than that of the lineshaft 12. Such rotation of the gear 60a rotates the pinions 24 and 28, which in turn rotate the gears 23a and 32a at a relatively slow speed compared to the lineshaft speed.

Since it is apparent that the gear 18a of the first differential gearing assembly M will rotate at substantially the speed of the lineshaft 12, the shaft 22 and the brake drum 37 are thereby initially caused to rotate.

In order to start rotation of the output shaft 27, a braking torque is applied to the drum 37 as described above, and the developed heat is drained away by circulating water.

The braking torque is transferred through the gears 19 and 20 to the gear 32a and the gear 23a. The braking torque opposes the relatively free rotation of the pinions 24 and 28, and the carrier 29 is thereby compelled to rotate. As described before, the braking may be continued until the brake drum is brought to a full stop, thereby simultaneously bringing the output train and load up to speed.

The embodiment of Figure 2 may be shut down by mere disengagement of the brake shoes 38 from the brake drum 37, thereby permitting the load 31 to coast to a standstill.

Thus a second advantageous structure is provided. This structure may also be subjected to the various modifications suggested above in connection with the description of the first embodiment. It is apparent that the brake herein provided in the various embodiments and modifications thereof is operative to accelerate the connected load and not to decelerate it.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a paper machine having a driven rigid lineshaft member, a drive mechanism having a driving member for being drivingly connected to a section of the machine to drive said section, said mechanism comprising in combination: a housing; a pair of differential gearing assemblies within said housing and each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; a variable speed-ratio drive powered by the lineshaft member and drivingly connected to said control element; the second of said elements of one of said differential gearing assemblies comprising planetary gearing supported on means drivingly and rigidly connected to the driving member; and a brake rigidly connected to the second of said elements of the other of said differential gearing assemblies.

2. In a paper machine having a driven lineshaft member, a drive mechanism having a driving member for being drivingly connected to a section of the machine to drive said section, said mechanism comprising in combination: a housing; a pair of differential gearing assemblies within said housing and each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; a variable speed-ratio drive powered by the lineshaft member and drivingly connected to said control element; the second of said elements of said first differential gearing assembly comprising planetary gearing supported on means drivingly and rigidly connected to the driving member; and a brake rigidly connected to the second of said elements of said second differential gearing assembly.

3. In a paper machine having a driven lineshaft member, a drive mechanism having a driving member for being drivingly connected to a section of the machine to drive said section, said mechanism comprising in combination: a housing; a pair of differential gearing assemblies within said housing and each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; a variable speed-ratio drive powered by the lineshaft member and drivingly connected to said control element; the second of said elements of said second differential gearing assembly comprising planetary gearing supported on means drivingly and rigidly connected to the driving member; and a brake rigidly connected to the second of said elements of said first differential gearing assembly.

4. In a paper machine having a driven lineshaft member, a drive mechanism having a driving member for being drivingly connected to a section of the machine to drive said section, said mechanism comprising in combination: a pair of differential gearing assemblies each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; means actuated by the lineshaft member drivingly connected to said control element to impart, via said second differential gearing assembly, to the driving member a controlled speed creating a speed differential between said members; the second of said elements of one of said differential gearing assemblies comprising planetary gearing supported on means drivingly and rigidly connected to the driving member; and a brake rigidly connected to the second of said elements of the other of said differential gearing assemblies.

5. In a paper machine having a driven lineshaft member, a drive mechanism having a driving member for being drivingly connected to a section of the machine to drive said section, said mechanism comprising in combination: a pair of differential gearing assemblies each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; means actuated by the lineshaft member drivingly connected to said control element to impart, via said second differential gearing assembly, to the driving member a controlled speed creating a speed differential between said members; the second of said elements of one of said differential gearing assemblies comprising planetary gearing supported on means drivingly and rigidly connected to the driving member; a brake drum rigidly connected to the second of said elements of the other of said differential gearing assemblies; and means for selectively applying a drag force to said brake drum.

6. In a paper machine having a driven lineshaft member, a drive mechanism having a driving member for being drivingly connected to a section of the machine to drive said section, said mechanism comprising in combination: a pair of differential gearing assemblies each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; a variable speed-ratio element having a rotatable input shaft and a rotatable output shaft, said output shaft being mounted to operatively drive said control element, said input shaft driven via said lineshaft member for creating a variable speed differential between said members; the second of said elements of one of said differential gearing assemblies comprising planetary gearing supported on means drivingly and rigidly connected to the driving member; and a brake rigidly connected to the second of said elements of the other of said differential gearing assemblies.

7. In a paper machine having a driven lineshaft member, a drive mechanism having a driving member for being drivingly connected to a section of the machine to drive said section, said mechanism comprising in combination: a pair of differential gearing assemblies each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; a gear train connected to drive said control element; a variable speed-ratio element having a rotatable input shaft and a rotatable output shaft, said output shaft being mounted to operatively drive said gear train, said input shaft driven via said lineshaft member for creating a variable speed differential between said members; the second of said elements of one of said differential gearing assemblies comprising planetary gearing supported on means drivingly and rigidly connected to the driving member; and a brake rigidly connected to the second of said elements of the other of said differential gearing assemblies.

8. In a paper machine having a driven lineshaft member, a drive mechanism having a driving member for being drivingly connected to a section of the machine to drive said section, said mechanism comprising in combination: a housing; a pair of differential gearing assemblies within said housing and each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; a variable speed-ratio drive powered by the lineshaft member and drivingly connected to said control element; the second of said elements of one of said differential gearing assemblies comprising planetary gearing supported on means drivingly and rigidly connected to the driving member; a shaft rigidly connected to the second of said elements of the other of said differential gearing assemblies and extending outwardly of said housing; a brake rigidly connected to said shaft outside of said housing; means for continually supplying a cooling liquid to an exposed portion of said brake; and means for selectively actuating said brake.

9. In a paper machine having a driven rigid lineshaft member, a drive mechanism having a driving member for being drivingly connected to a section of the machine to drive said section, said mechanism comprising in combination: a housing; a pair of differential gearing assemblies within said housing and each having three rotary elements; the first of said elements of the first of said differential gearing assemblies being drivingly connected to the lineshaft member; the third of said elements of the first of said assemblies being drivingly connected to the first of said elements of the second of said differential gearing assemblies; the third of said elements of said second assembly being a control element; a gear train rigidly connected to drive said control element; a rigid type variable speed-ratio element having a rotatable input shaft and a rotatable output shaft, said output shaft being mounted to operatively drive said gear train, said input shaft driven via said lineshaft member for creating a variable speed differential between said members; the second of said elements of one of said differential gearing assemblies comprising planetary gearing supported on means drivingly and rigidly connected to the driving member; a shaft rigidly connected to the second of said elements of the other of said differential gearing assemblies and extending outwardly of said housing; a brake rigidly connected to said shaft outside said housing; means for continually supplying a cooling liquid to an exposed portion of said brake; and means for selectively actuating said brake.

10. In a paper machine having a driven lineshaft member, a drive mechanism having a driving member for being drivingly connected to a section of the machine to drive said section, said mechanism comprising in combination: a housing; a first differential gearing assembly supported by said housing and having three rotary elements, the first of said elements having driving connection with the lineshaft member to be driven thereby; a second differential gearing assembly supported by said housing and also having three rotary elements, the first of said elements having driving connection with the third of the elements of said first assembly to be driven thereby; a variable speed-ratio drive powered by the lineshaft member and drivingly connected to the third of said elements of said second assembly; and a brake; said second elements individually including planetary gearing supported on means respectively having rigid driving connection with one of said brake and the driving member.

11. A drive mechanism for transferring power from a rotating source of power to a rotatable load comprising in combination: a pair of differential gearing assemblies each having three elements; the first of said elements of the first of said differential gearing assemblies being drivingly rotatably connected to the source of power; the third of said elements of the first of said assemblies being drivingly rotatably connected to the first of said elements of the second of said differential gearing assemblies; means limiting rotation of the third of said elements of said second assembly; the second of said elements of one of said differential gearing assemblies comprising planetary gearing supported on means drivingly and rigidly connected to the load for rotatably driving the load; a brake corotatably connected to the second of said elements of the other of said differential gearing assemblies; and means for selectively applying a drag force to said brake drum to stop rotation of said second element to thereby rotatably drive the load.

12. A drive mechanism for transferring power from a rotating source of power to a rotatable load comprising in combination: a pair of differential gearing assemblies each having three elements; the first of said elements of the first of said differential gearing assemblies being drivingly rotatably connected to the source of power; the third of said elements of the first of said assemblies being drivingly rotatably connected to the first of said elements of the second of said differential gearing assemblies; the third of said elements of said second assembly being a control element; means actuated by the source of power drivingly connected to said control element to impart, via said second differential gearing assembly, to the load a controlled speed creating a speed differential between the source of power and the load; the second of said elements of one of said differential gearing assemblies comprising planetary gearing supported on means drivingly and rigidly connected to the load for rotatably driving the load; a brake corotatably connected to the second of said elements of the other of said differential gearing assemblies; and means for selectively applying a drag force to said brake drum to stop rotation of said second element to thereby rotatably drive the load.

13. A drive mechanism for transferring power from a rotatating source of power to a rotatable load comprising in combination: a pair of differential gearing assemblies each having three rotary elements; an input power train having a first branch rigidly connecting the first of the elements of the first of said assemblies to the source of power; the third of said elements of the first of said assemblies being drivingly connected to the first of said elements of the second of said differential gearing assemblies; an output train rigidly drivingly connecting the second of said elements of one of said assemblies to the load; a second branch of said power train rigidly connecting the third of said elements of said second assembly to the source of power, said second branch including step-down means for rotating said third element at a speed which is less than that of the first element of said first assembly; a brake rigidly connected to the second of said elements of the other of said assemblies; and means for selectively actuating said brake to stop rotation of said second element to thereby rotatably drive the load.

References Cited in the file of this patent

UNITED STATES PATENTS

| | | |
|---|---|---|
| 2,164,504 | Dodge | July 4, 1939 |
| 2,555,016 | Trofimov | May 29, 1951 |
| 2,803,315 | McPhee et al. | Aug. 20, 1957 |